P. P. NUNGESSER.
MACHINE FOR FILLING DRY BATTERIES.
APPLICATION FILED AUG. 4, 1908.

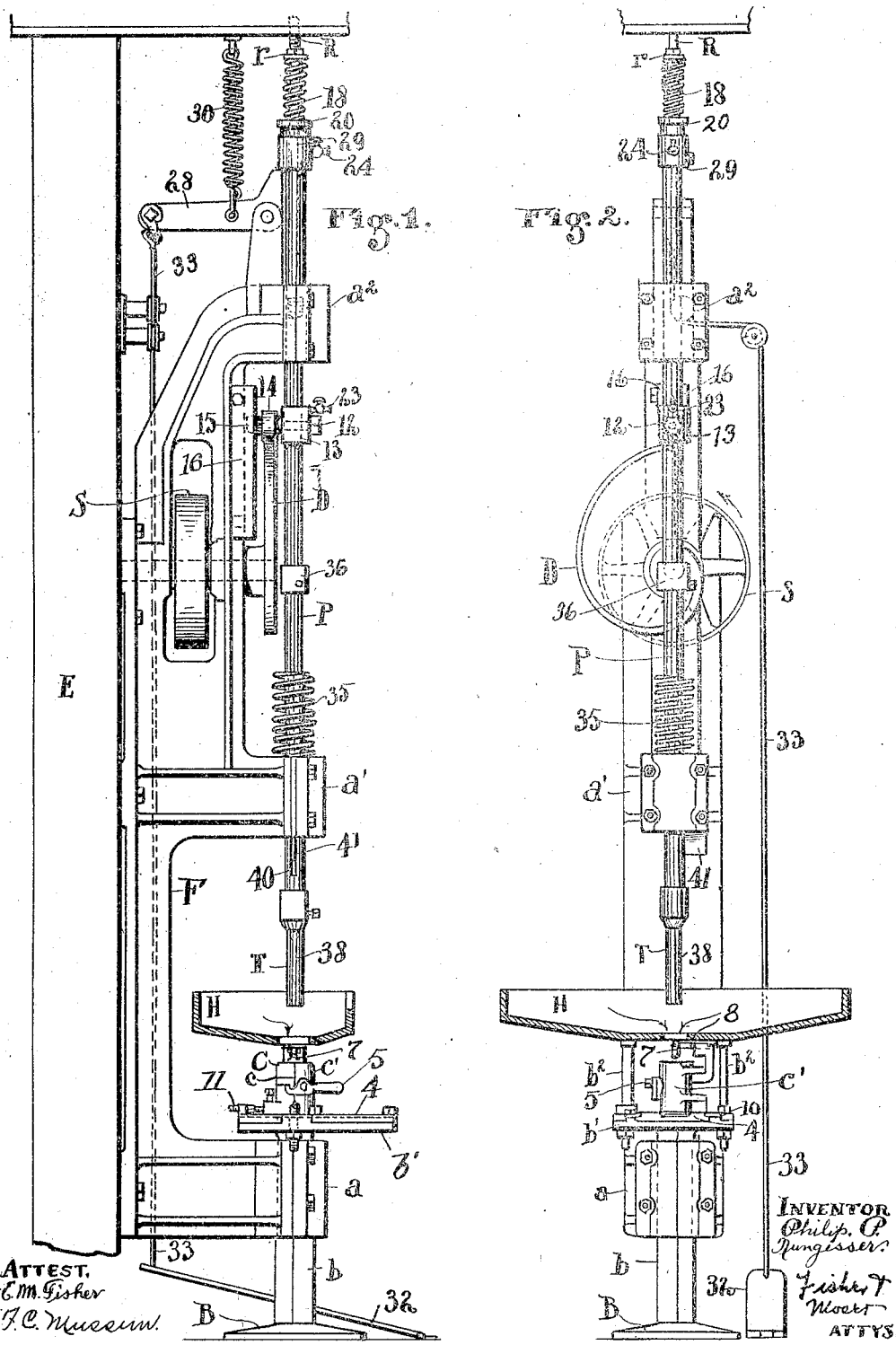

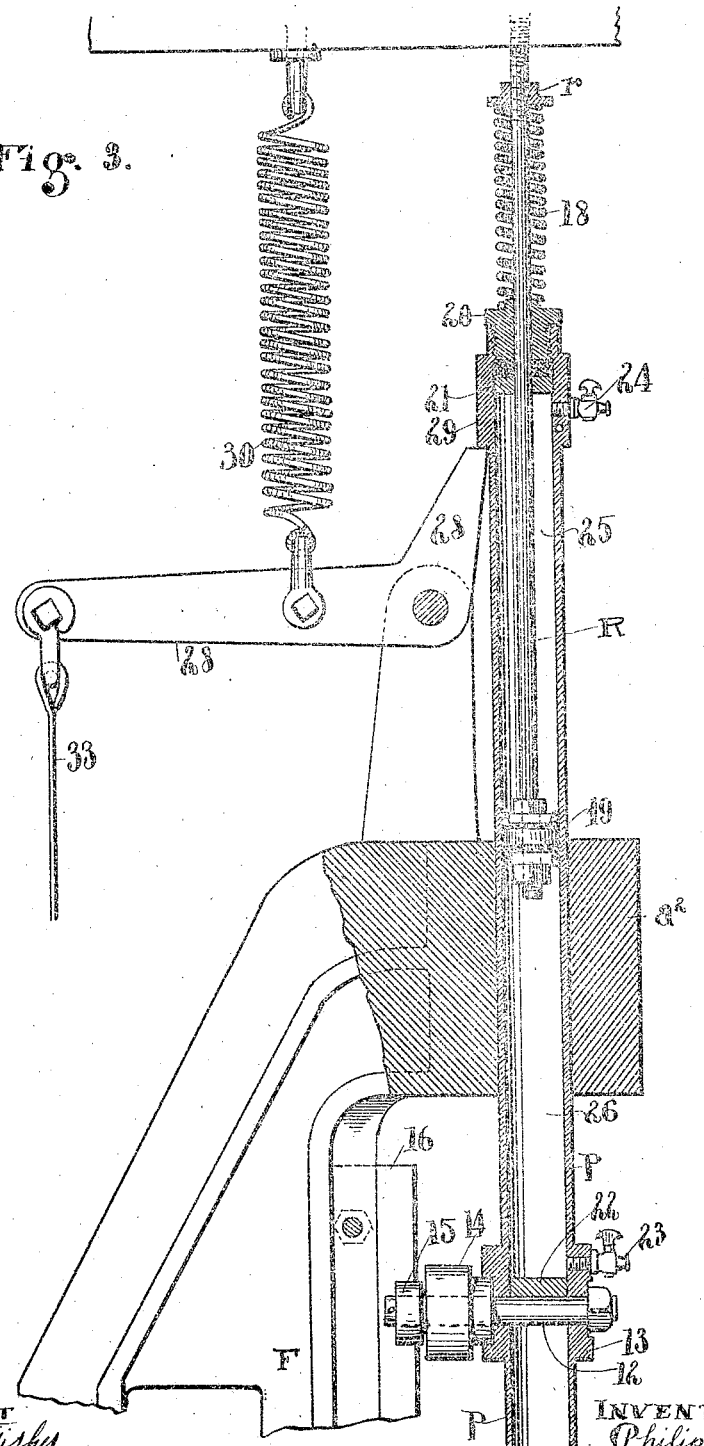

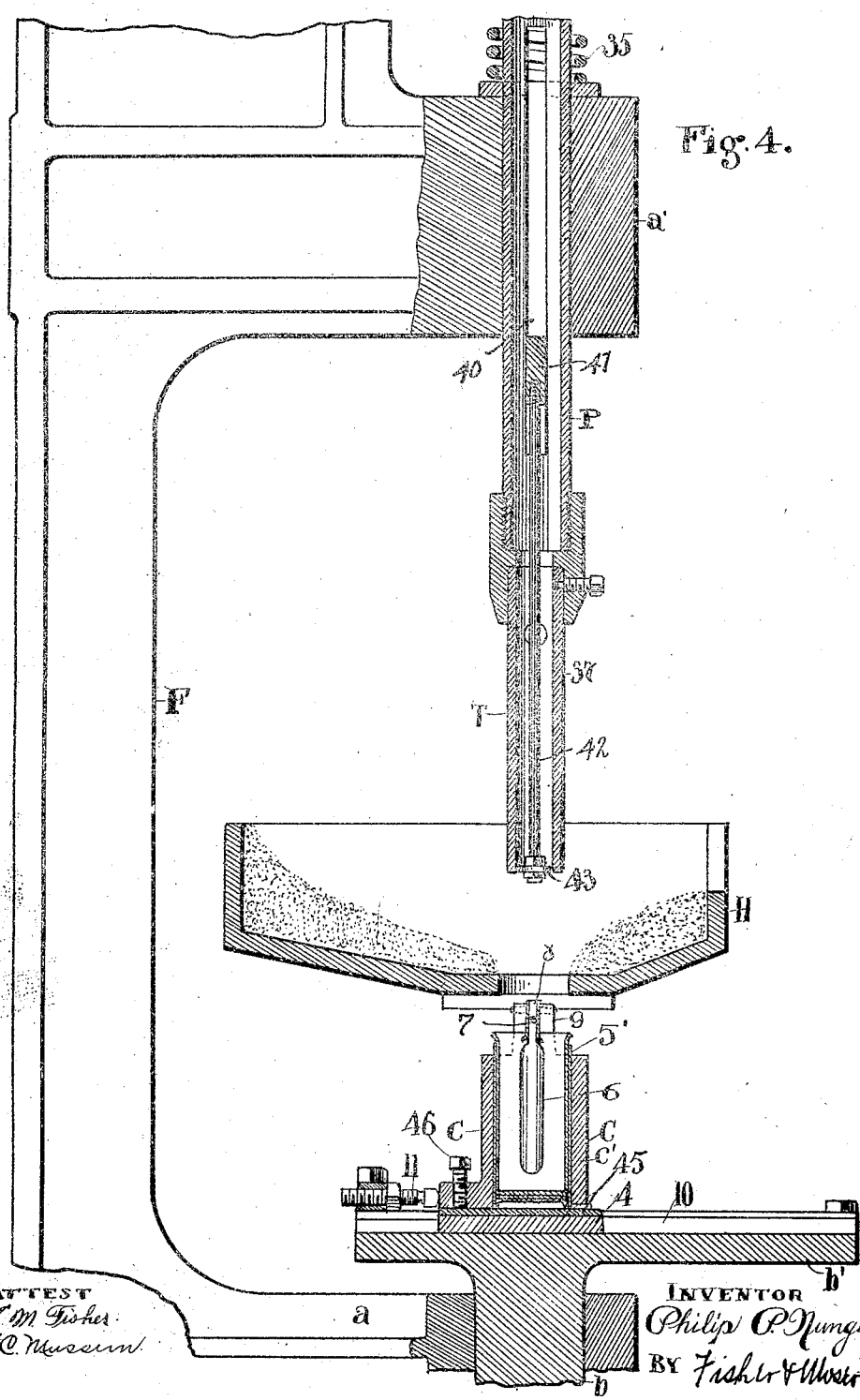

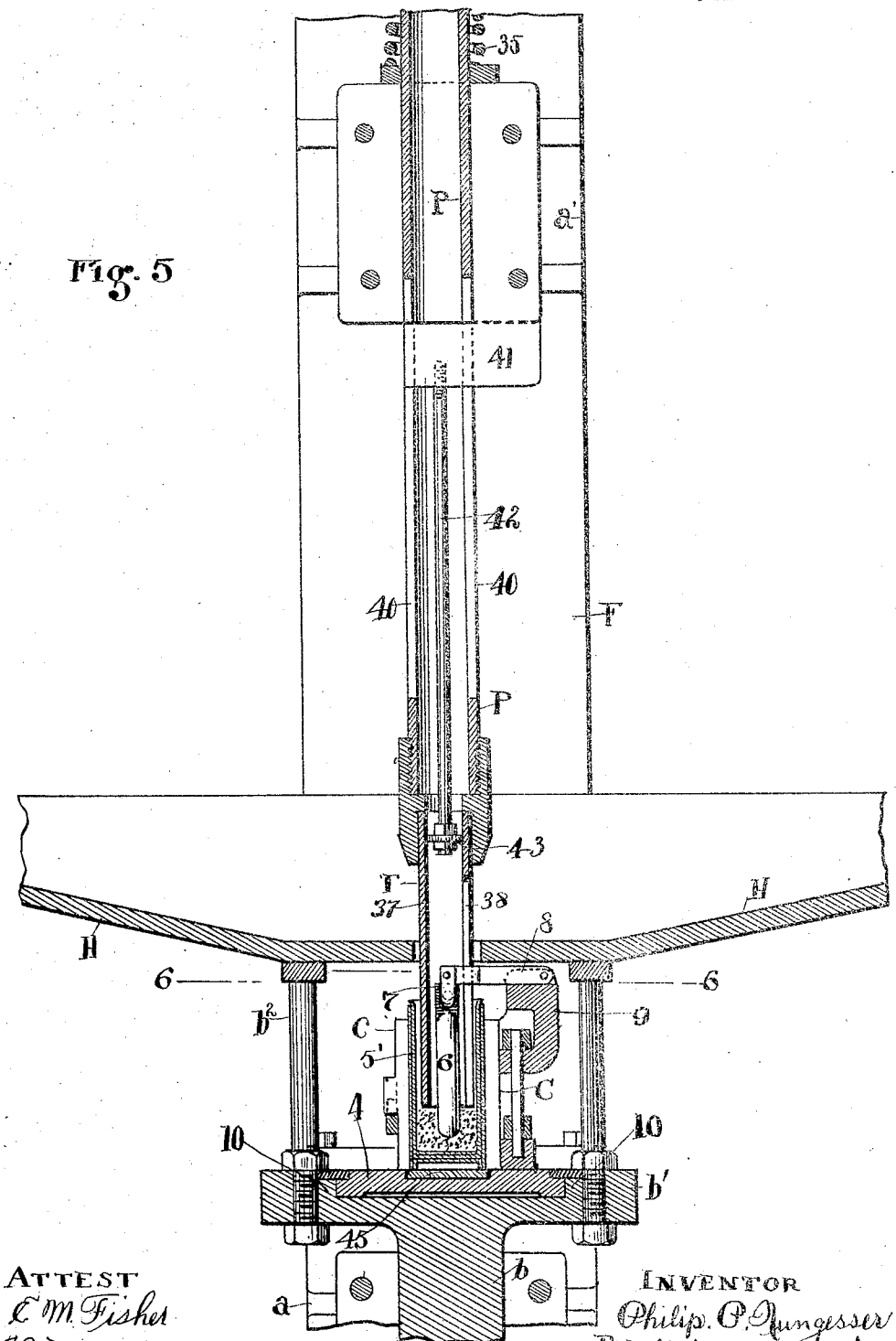

985,691.

Patented Feb. 28, 1911.

5 SHEETS—SHEET 5.

ATTEST
E. M. Fisher
J. C. Musson

INVENTOR
Philip P. Nungesser,
BY Fisher & Moser ATTYS

UNITED STATES PATENT OFFICE.

PHILIP P. NUNGESSER, OF CLEVELAND, OHIO, ASSIGNOR TO THE NUNGESSER ELECTRIC BATTERY COMPANY, OF CLEVELAND, OHIO, A CORPORATION.

MACHINE FOR FILLING DRY BATTERIES.

985,691. Specification of Letters Patent. Patented Feb. 28, 1911.

Application filed August 4, 1908. Serial No. 446,903.

*To all whom it may concern:*

Be it known that I, PHILIP P. NUNGESSER, a citizen of the United States, residing at Cleveland, in the county of Cuyahoga and State of Ohio, have invented certain new and useful Improvements in Machines for Filling Dry Batteries, and do declare that the following is a full, clear, and exact description of the invention, which will enable others skilled in the art to which it appertains to make and use the same.

My invention relates to a machine for filling dry batteries, and the invention consists in the construction and combination of parts substantially as shown and described and particularly pointed out in the claims.

Figure 6:
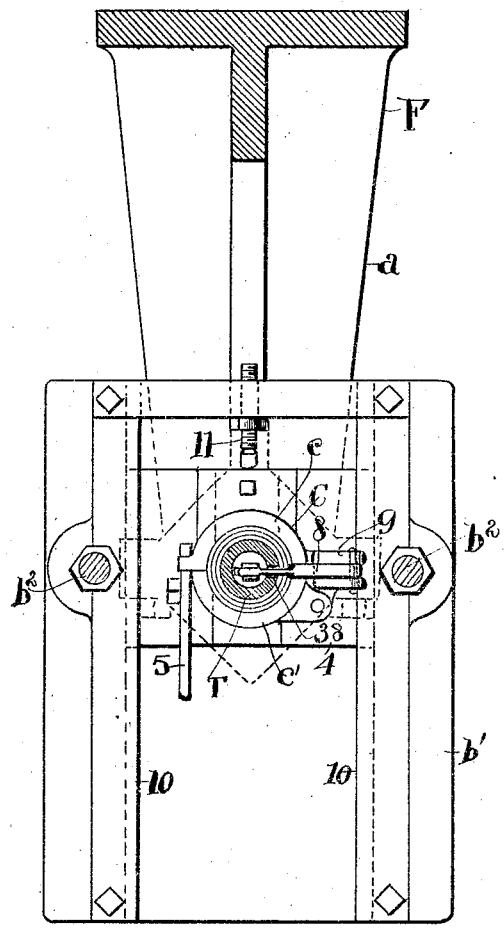
Figure 7:
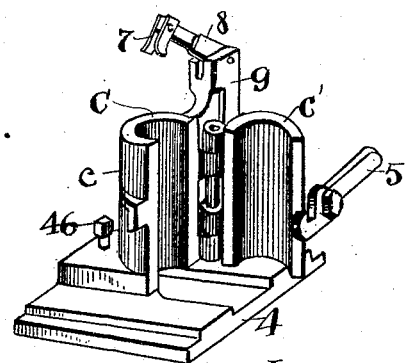

In the accompanying drawings, Figure 1 is a side elevation of the machine, and Fig. 2 is a front elevation thereof with the hopper in section in both views. Fig. 3 is a relatively enlarged vertical sectional elevation of the upper portion of the machine, the parts being positioned substantially as seen in Fig. 1. Fig. 4 is an enlarged sectional elevation of the lower portion of the machine not shown in Fig. 3, but otherwise corresponding to said figure and to Fig. 1. Fig. 5 is a vertical sectional elevation of the lower part of the machine corresponding in this particular with Fig. 2 but with the plunger tube and parts down in tamping position, whereas said parts are in raised position in Fig. 2. Fig. 6 is a plan view of line 6—6, Fig. 5, and Fig. 7 is a perspective view of the cup and carbon holder shown as open to receive a cup and carbon.

In the machine as thus shown, B represents the base as an entirety, which is designed to stand upon a solid or unyielding foundation and which comprises a standard $b$ and a flat laterally extending table support $b'$, said portions being all cast in one piece and constituting a single member referred to hereinafter as the base of the machine.

E represents a post or upright, which may be a portion of the building or other similar sustaining member, to which the metallic frame F is bolted or attached. Said frame is a single piece of casting in this instance and has three several arms $a$, $a'$ and $a^2$ projecting forwardly therefrom and adapted to carry operating members as will hereinafter appear. However, the lower arm $a$ is clamped directly to the standard of base B beneath table $b'$ and which permanently connects these parts into a combined structure.

The handwork of the machine is performed immediately over the table support $b'$, which comes to a suitable elevation or level for the convenience of the operator, say approximately three feet from the floor, and the hopper H, adapted to receive the flour or material with which the cups or cans are filled is supported from the said base $b'$ by suitable posts or uprights $b^2$ and has a hole at its center for the passage of tamping tube T and the feed of the material. Said hopper, therefore, is rigidly supported from the base and remains stationary throughout all the operations.

C represents the so-called cup or can holder shown clearly in Fig. 7, and comprising two sections hinged together and having the section $c$ stationary with its supporting table 4 and the section $c'$ hinged thereon to swing into closed position with relation thereto and having a catch or latch 5 to automatically lock when the sections are closed. The table or stand 4 is slidable laterally or back and forth toward the operator within limits so as to withdraw the said holder from under the hopper to place a can or cup $5'$ therein to be filled as well as to suspend the carbon 6 centrally in said cup in position where it is to remain when the cup has been filled. To this end I provide a two-finger spring clamp or device 7 adapted to engage the reduced end or stem of the carbon, and said device is supported on arm 8 pivoted in standard 9 on the cup support C. The spring clamp 7 is sufficiently strong to grip the carbon and hold it firmly in the can while the can is being filled and tamped with the material, and when filled and the operations are momentarily suspended the tube T is withdrawn and held in raised position, the can holder swung open, and the carbon clamp released by raising the same, when the filled can or cup is removed. Another can or cup and a carbon are then immediately placed in position in the said holder, when the holder is again closed and the parts pushed back and operations are resumed to fill the can as before, and so on repeatedly and rapidly, because the operations are such as to require only a few moments to fill the can when these preliminaries have been taken care of. It is to be observed in this connection that the tamping or filling of the can occurs upon a perfectly solid or unyielding foundation, and that there is no receding or dropping of the can or its bottom support as the filling proceeds and as is expressly provided for in the machine patented by me under date of January 9, 1906, No. 809,526. Experience has demonstrated that a better construction and better results in filling battery cans is obtained by working to a solid tamping base and depending upon a yielding tamping mechanism to do the work uniformly as to the full depth of the can, as well as for the cans successively so as to have them all packed exactly alike. The said table, 4, which carries the can and its holder is adapted to be set centrally beneath plunger or tamper P by a set screw 11 on the base b', and otherwise is centered by and between guides 10 on said base within which it slides. Now, having the parts in position relatively as seen in Figs. 1 and 4 and ready for use, the tamping or packing of the material proceeds from mechanism receiving power from or through the shaft carrying the band or like wheel S, and upon which shaft the cam D is supported. Said cam is designed to actuate the packing plunger P, and a bolt or shaft 12 extends transversely through the said plunger and through a sleeve 13 about the same and has a roller or wheel 14 mounted thereon and adapted to be engaged by the said cam to lift the plunger. A small roller 15 is mounted upon the extremity of said shaft 12 outside of roller 14 and runs between the two lateral guides 16 fixed upon frame F and serves to hold the said plunger and roller 14 in alined working relation in all the movements of the plunger up and down.

From this construction and operation of parts it will be understood that the plunger or tamping tube does not rotate axially in its movements but is confined to a direct vertical travel or movement. Then to obtain impact or thrust of the plunger I depend mainly upon spring 18, which is wound spirally about a rod R suspended from any suitable framework above and, projecting into the plunger tube, carries a piston 19 therein. The said spring 18 bears upon a screw cap 20 on the top of said plunger, and packing next to said cap confined by a ring or disk 21 beneath the same serves to make the tube air tight at its top and between the same and piston 19. Another disk 22 is inserted in the plunger tube P immediately over the cross rod or shaft 12 which carries roller 14, and is made air tight therein by any suitable means, so that the said tube or pipe P practically provides two air chambers between its ends divided by piston 19 and each of which has an air controlling valve or cock 23 and 24 respectively, whereby an auxiliary spring or cushioning effect may be obtained supplementing or modifying the action of spring 18 as the work may require and assisting in determining and assuring uniform packing of the material in the battery can. In operation therefore the cam D lifts the plunger tube, and, having passed the roller, permits the plunger to drop both by its own gravity and under the tension of spring 18 to force it down. If there be air under pressure confined in the lower air space 26 by reason of valve 23 being closed, the expansion of the air in the descent of the plunger will accentuate its thrust and lend proportionately to the impact in the battery cup. However, this may be offset by admitting a comparatively small volume of air in the said air space 26, and which would in proportion retard the descent of the plunger. Air admitted into the upper space 25 by valve 24 would also retard and cushion the down stroke of the plunger tube. It is clear, therefore, that the two air spaces or chambers controlled by the two valves 23 and 24 enable me to graduate the stroke or blow of the plunger upon the material in the can to practically any desired degree or measure, and having determined the same by this mechanism I can set the mechanism for uniformity in all the work turned out by the machine. While the tamping proceeds as it has begun, Fig. 5, the operator is in position to feed the right proportions of the material into the can from hopper H during the time plunger P is withdrawn, and in approximately even measure with each stroke so that the plunger will have about the same work to do each time, and about nine strokes of the plunger are sufficient to fill and pack the can with the flour or material. When a can is filled, the operations of the plunger are temporarily suspended by throwing the bell crank lever 28 into position beneath collar 29 on the plunger. This collar carries the valve 24 and forms a shoulder for the said lever 28 to engage and hold the plunger in its raised position against the compression of spring 18. This also permits cam D to continue rotation but without affecting the plunger, and a spring 30 holds the said lever in engaging position with the plunger, as seen in Figs. 1 and 3, until released by the operator through the treadle 32. Said treadle is connected with the free end of said lever 28 by a cord or wire 33, and the said lever 28 is released by the foot of the operator and is held out of locking engagement by his foot until a can has been filled and is ready to be removed. Then the foot is removed and lever 28 springs into engagement with collar 29 and holds the plunger in suspended position as before. At the beginning of the filling and tamping operations it is desirable to cushion the blow of the plunger more or less for obvious reasons, and this is accomplished in this instance by means of a spiral spring 35 on the plunger over the arm a' of the main frame, adapted to be engaged by a collar 36 adjustably fixed upon the plunger higher up and which strikes the said spring in its descent and more or less arrests the downward stroke of the plunger or at least breaks its force. It will be observed, also, that the plunger is provided with a removable lower extremity or end portion 37, which is the part that enters the can and has a lengthwise slot 38 to accommodate the arm 8 which carries the carbon clamp 7, so that in the reciprocation of the plunger there will be necessary accommodation at this point for said arm and obstruction will be avoided. The plunger tube or pipe P likewise is provided with opposite slots 40 lengthwise adapted to accommodate an L shaped plate 41, which extends into the plunger edgewise in its lower portion and carries a rod 42 on which is affixed a disk 43. These parts 41 to 43, are stationary with main frame F and the plunger reciprocates in respect thereto, so that disk 43 becomes a cleansing member or clearing member for the lower portion of the plunger and particularly for the separate portion 37. This portion of the plunger in time is liable to become worn at its lower end, particularly, where it strikes the material and requires replacing after a time. The top portion b' of the base extends forward of the hopper far enough to draw the cup holder out thereon beyond the hopper to remove the filled cup and to place another thereon, with the carbon, when the holder and its stand or base 4 are pushed back to filling position. Said stand or base may be a separate part or integral with one section or half of the said holder.

A supplemental plate 45 is removably placed beneath can 5 in a slot in table 4 to take the wear occasioned by the continual thrust of the can during filling operation, and said plate is adjustably held in place by set screw 46.

The machine is adapted to fill different sizes of batteries with different grades of material, and this when cushioning adjustments by the valves 23 and 24 at once set, uniform results are produced. Light tamping or heavy tamping of the material may take place as required, and adjustments may be made to obtain a varying blow during filling operations of each can or a uniform blow throughout, all as predetermined by adjustment of the nut r above spring 18 or the amount of air taken in or excluded from the respective air chambers 25 and 26. A quick down action is desired at the start. This spring 18 supplies. But at the end of each stroke cushioning is desired. This the piston and air chambers supply.

Base member 4 is recessed from its front end through to the rear immediately beneath can holder C and a steel or otherwise suitable metal plate 45 is removably mounted in this recess and adjustably secured therein by set screw 46. As each successive can is filled the force of the tamping blows is transmitted to plate 45 which takes up all wear and which may be replaced whenever circumstances require.

What I claim is:—

1. A machine for filling dry batteries comprising a cup holder and a carbon support pivotally mounted on said holder and consisting of a pivoted arm and a spring clamp thereon to engage the carbon.

2. A machine for filling dry batteries comprising a cup holder and a carbon supporting arm mounted thereon, in combination with a tubular plunger having a slot lengthwise and said arm adapted to project through said slot into said plunger.

3. A machine for filling dry batteries comprising a suitable base and a cup holder thereon, a carbon supporting device mounted on said holder, and a tubular plunger having an open slot in its lower end into which said device is adapted to project and having spring clamps on its inner end to hold a carbon.

4. A machine for filling dry batteries comprising a feed hopper having a hole in its bottom, a cup holder next beneath said hopper, a plunger adapted to enter said holder through said hopper and a carbon support mounted on said holder and extending into said plunger.

5. A machine for filling dry batteries having a tubular plunger provided with a longitudinal slot, a fixed projection extending into said slot, and a device attached to said projection and adapted to cleanse said plunger internally.

6. In a machine for filling dry batteries, a tubular plunger and means to lift the same consisting of a rotatable cam and a roller supported on said plunger engaged by said cam, and means to depress the plunger comprising a metallic spring and a fixed piston working in said plunger, the said plunger being constructed to provide air chambers on opposite sides of said piston.

7. In a machine for filling dry batteries, a tubular plunger and a fixed piston supported in the upper end thereof, said plunger constructed to provide air compression spaces on opposite sides of said piston provided each with an air controlled opening, and a spring adapted to press downward on said plunger.

8. In a machine for filling dry batteries, a vertically reciprocating tubular plunger closed between its ends to form an air chamber, a fixed rod entering the same at the top and a piston thereon in said air space, and a spring about said rod bearing upon said plunger, said air space having a valve controlled vent on each end.

9. In a machine for filling dry batteries, the combination of a vertically reciprocating plunger having a shoulder about the same, a device adapted to engage beneath said shoulder and hold the plunger in raised position and means to engage and disengage said device.

10. In a machine for filling dry batteries, a vertically reciprocating plunger provided with a lateral projection, in combination with a device adapted to engage said projection and a foot controlled lever and connections therefrom to said device to shift the same and release the plunger.

11. In a machine for filling dry batteries, a vertically reciprocating plunger and means to raise the same, in combination with means to hold the plunger when raised comprising a pivoted lever and a projection on the plunger engaged thereby.

12. In a machine for filling dry batteries, a plunger having a collar, a pivoted lever adapted to engage beneath said collar, a spring to hold the lever in engagement and foot controlled means to release said lever.

13. In a machine for filling dry batteries, a plunger and a collar thereon, a lever adapted to engage beneath said collar and a spring to hold the lever in engagement, in combination with devices to release said lever comprising a foot controlled member and a cord connecting the same with said lever and adapted to pull against the tension of said spring.

14. A machine for filling dry batteries comprising a tamping plunger, means to lift the same, and fluid devices to cushion the tamping blow of said plunger.

15. A machine for filling dry batteries comprising a tamping plunger, means to raise the same, and fluid devices having valves adapted to provide for varying cushioning effects on the down stroke of said plunger.

16. A machine for filling dry batteries, comprising a tamping plunger and means to impart a quick stroke thereto upon initial down movement thereof, and means to cushion the end tamping strokes of said plunger.

17. A machine for filling dry batteries comprising a two part cup holder and a support therefor, and means to support a carbon stick mounted on one of said cup holder parts and the other part free to open.

18. A machine for filling dry batteries comprising a base, a cup-holder thereon, a plunger adapted to tamp the material within said holder, a cam to lift the plunger, a compression spring to thrust the plunger downward, and means to variably change the degree of compression of said spring.

19. A machine for filling dry batteries comprising a gravity tamping plunger, a rotatable cam adapted to lift the plunger, a cushioning spring for the plunger, and adjustable means for the spring to meet variable conditions in the operation of said plunger.

20. A machine for filling dry batteries having a plunger and means to prevent the same from rotating, a roller mounted on one side of the plunger and a power actuated cam arranged to engage said roller, and a spring and adjustable means to force the plunger downward when released by said cam.

21. A machine for filling dry batteries having a vertically movable plunger and means to lift the same to dropping position, and means to depress the plunger comprising a spring adapted to press downwardly thereon and a fixed rod and an adjustable nut engaged by said spring.

22. In a machine for filling dry batteries, a stationary feed hopper and a stationary base having a laterally projecting top extending beyond the edge of said hopper, in combination with a laterally movable stand and cup holder adapted to be shifted forwardly on said top beyond said hopper to facilitate interchange of cans and introduction of carbons into the cans during operations.

23. A machine for filling dry batteries comprising a two-part cup holder, a stand on which one of said parts is fixed and the other of said parts hinged to swing open, and a stationary base having guides in which said stand is mounted to slide horizontally to the front of the machine, and an adjustable stop at the rear of said base to limit the inward movement of said stand.

24. A machine for filling dry batteries having a stationary feed hopper with a hole in its bottom, a stationary base beneath said hopper having a top projecting to the front beyond said hopper and provided with guide ways, a cup holder and a stand therefor slidable in said guide-ways between said base and said hopper, an adjustable stop adapted to limit the inward movement of said stand, and said holder provided with a hinged section adapted to be opened.

25. A machine for filling dry batteries comprising a frame with an arm, a plunger adapted to reciprocate variably in said arm, a spring about said plunger resting on said arm and a collar having means to adjustably fix the same at different points on the plunger to strike said spring and cushion the descent of the plunger to any degree as may be predetermined.

26. In a machine for filling dry batteries, a stationary base and a cup holder thereon, in combination with a gravity plunger and means to raise the same, and a spring having a connection with the top of the plunger and with a stationary part and means to adjustably change the working relations between said spring and plunger.

27. In a machine for filling dry batteries, a stationary base and a cup holder thereon, in combination with a gravity plunger adapted to move variable distances on its down stroke, means to raise the plunger and an adjustable cushioning device adapted to be set to meet changeable conditions at the tamping end of the plunger.

In testimony whereof I sign this specification in the presence of two witnesses.

PHILIP P. NUNGESSER.

Witnesses:
E. M. FISHER,
F. C. MUSSUN.